(12) United States Patent
Sintorn et al.

(10) Patent No.: US 8,819,341 B2
(45) Date of Patent: Aug. 26, 2014

(54) METHOD AND DEVICE FOR CACHING IN A WIRELESS PEER-TO-PEER NETWORK

(75) Inventors: Mathias Sintorn, Sollentuna (SE); Fredric Kronestedt, Ekero (SE); Jari Vikberg, Jarna (SE); Lars Westberg, Enkoping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 413 days.

(21) Appl. No.: 13/079,374

(22) Filed: Apr. 4, 2011

(65) Prior Publication Data

US 2012/0254543 A1 Oct. 4, 2012

Related U.S. Application Data

(63) Continuation of application No. PCT/SE2011/050372, filed on Mar. 31, 2011.

(51) Int. Cl.
*G06F 12/00* (2006.01)
*H04L 29/08* (2006.01)

(52) U.S. Cl.
CPC .......... *H04L 67/104* (2013.01); *H04L 67/2857* (2013.01); *H04L 67/1078* (2013.01)
USPC ......................... 711/118; 455/414.1; 370/328

(58) Field of Classification Search
USPC ......................... 711/118; 455/414.1; 370/328
See application file for complete search history.

(56) References Cited

U.S. PATENT DOCUMENTS

2004/0066770 A1 4/2004 Pabla et al.
2008/0040545 A1* 2/2008 Twiss et al. .................. 711/119
2008/0172465 A1 7/2008 Kim et al.
2010/0261488 A1* 10/2010 Little et al. .................... 455/466
2010/0296448 A1* 11/2010 Vainikka et al. ............. 370/328
2012/0166618 A1* 6/2012 Dahod et al. .................. 709/224

FOREIGN PATENT DOCUMENTS

WO WO 2007/031981 A2 3/2007
WO WO 2009/080112 A1 7/2009

OTHER PUBLICATIONS

Microsoft Computer Dictionary, 2002, Microsoft Press, fifth edition, p. 232.*
International Search Report, PCT/SE2011/050372, Oct. 28, 2011.
Written Opinion of the International Searching Authority, PCT/SE2011/050372, Oct. 28, 2011.

* cited by examiner

*Primary Examiner* — Jared Rutz
(74) *Attorney, Agent, or Firm* — Myers Bigel Sibley & Sajovec, P.A.

(57) ABSTRACT

The invention relates to a method and entity that allow for saving of uplink bandwidth in connection with peer-to-peer sharing in a wireless communication system. A caching entity, called a reverse cache, intercepts a point-to-point connection between a mobile network user plane gateway and a wireless user equipment running a peer-to-peer application. The reverse cache caches content loaded to the peer-to-peer application and stores information indicative of the wireless user equipment to which the cached content is loaded. A request on the point-to-point connection for delivery of a first content from the wireless user equipment is intercepted by the reverse cache. When the requested first content is cached in the reverse cache along with information indicating that the requested first content has been loaded to the wireless user equipment, the reverse cache responds by delivering the requested first content, without involving the wireless user equipment.

16 Claims, 10 Drawing Sheets

METHOD AND DEVICE FOR CACHING IN A WIRELESS PEER-TO-PEER NETWORK

CROSS REFERENCE TO RELATED APPLICATION

This application claims priority from PCT International Application No. PCT/SE2011/050372, filed on 31 Mar. 2011, the disclosure and content of which is incorporated by reference herein in its entirety.

TECHNICAL FIELD

The present invention relates to caching of content related to peer-to-peer sharing and in particular to peer-to-peer sharing in a wireless communication system.

BACKGROUND

It is common that novel online media services for e.g. music and movies use peer-to-peer (P2P) techniques for media distribution between the users, also referred to as peers. FIG. 1 illustrates schematically P2P sharing of content such as e.g. media content between a number of peers 103, 104, 109. In FIG. 1 it is illustrated that a media server 101 distributes content related to e.g. a music service 102 or a movie service 115. The peers 103, 104, 109 are able to download content from the media server 101 via an IP network 108, such as the Internet, as is schematically illustrated by arrows 105, 106 and 113. A key characteristic is that users that download content will also at the same time upload (share) the downloaded content to the other users that are interested in the same content. This is shown in FIG. 1 with dashed arrows 107 and 114 indicating that the peers 103 and 109 are also uploading content to the peer 104. By doing this, the service will scale with the number of peers without the need for additional hardware, like streaming servers. Additionally, this will improve the download speed for all users—the more users that are using the service, the better it will perform.

With the success of mobile broadband, the novel online media services enter also the wireless communication networks, alternatively referred to as mobile networks. This means that mobile users in a radio access network (RAN) also assist in P2P content distribution. In FIG. 1 a wireless communication network 110 is illustrated. The peer 109 is a wireless user equipment (UE) that participates in P2P sharing via a RAN 111 and a core network (CN) 112.

In wireless communication networks, the uplink, i.e. the direction from the mobile users to the network, has limited capacity and the UE has limited output power and battery capacity. A majority of the users are indoors and suffer from high building penetration losses. Accordingly bandwidth limitations in the uplink cause particular problems that need to be addressed.

For handheld smartphones the support of the media services is today solved by creating specific media service applications (so-called apps) that do not utilize the P2P techniques, i.e. no sharing, to avoid the uplink transmissions and only receive media content in the downlink (i.e. in the direction from the network to the mobile users). Media applications on laptops and PCs with wireless data cards or dongles for Internet access will on the other hand act as traditional P2P media applications for fixed access. Hence, these types of devices will generate a large load in the uplink due to media seeding and the battery consumption can be negatively affected for mobile devices without AC power. The main cause is that these devices participate in the media distribution more or less all the time when these devices are switched on and the media application is running. The media distribution can not be turned off since the services are designed to exploit this.

Caching in wireless communication networks is a relatively known technology. Caching is based on that a large percentage of Internet traffic is repetitive and that eliminating repeating content all the way from its origin may offer an opportunity to reduce traffic and increase download speed. Therefore, the main principle is that copies of the content in e.g. the Internet are moved closer to the mobile users and stored in a cache, for example in different parts of the RAN, in the CN or just “above” the CN.

The main benefits that can be achieved with caching in wireless communication networks are:

- Decrease the cost of transport in the wireless communication network. This is achieved “above the cache” as the cached information in principle is only transferred once in the transmission links above the cache.
- Improved Quality of Experience for the mobile end-users. This is mainly achieved with lower delays as the cached information can be returned faster to the mobile users from the cache compared to if the information would be retrieved all the way from the original location.
- Provide new services such as content hosting and storage/backup for operators. Mobile operators can sign agreements with the content providers that are based on that the mobile operator ensures that the content from a specific content provider is delivered in a better way to the mobile users in the mobile operator’s network.

Caching can also be used for the content distribution towards the mobile users as illustrated in FIG. 2. Instead of retrieving the downloadable content from the media server 101, the content can be retrieved from a cache 21 located in the wireless communication network 110. Arrow 24 illustrates that content from the media, server 101 is pushed in to the cache 21 in the wireless communication network 110 and then the wireless UEs 109 will receive the content directly from the cache 21, illustrated by dashed arrows 22 and 23, instead of from the media server 101. It is also worth mentioning that caching can be used for almost any Internet content and that FIG. 2 is just an example based on media services.

As mentioned above examples of problems with the prior art solutions for delivery of P2P media services in mobile networks are:

- Additional pressure and load on the already limited wireless uplink.
- Negative impact on the battery lifetime of the mobile UEs.
- The need to handle different application versions for the handheld smartphones and the laptops/PCs.

SUMMARY

An object of the present invention is to provide improved methods and devices that at least partly obviate some of the above mentioned problems.

The above stated object is achieved by means of a method and an entity according to the independent claims.

Embodiments described herein provide entities and methods for assisting a wireless user equipment with peer-to-peer sharing.

A first embodiment provides an entity for caching content related to peer-to-peer sharing in a wireless communication network. The entity comprises processing circuitry, interface circuitry, a receiver, a transmitter and a cache memory. The processing circuitry and the interface circuitry are configured to intercept a point-to-point connection between a gateway, acting as a mobile network user plane gateway, and a wireless user equipment running a peer-to-peer application. The cache memory is configured to cache content loaded to the peer-to-peer application and to store information indicative of the wireless user equipment to which the cached content is loaded. Thereby the cached content is associated with the wireless user equipment. The receiver is configured to intercept a request on the point-to-point connection. The request is a request for delivery of content from the wireless user equipment. The processing circuitry and the transmitter are configured to deliver the requested content, without involving the first wireless user equipment, if the requested content is cached in the cache memory and the cache memory includes information indicating that the requested content has been loaded to the wireless user equipment.

A second embodiment provides a method in a caching entity of a wireless communication network for performing caching operations related to peer-to-peer sharing. The method comprises a step of intercepting a point-to-point connection between a gateway acting as a mobile network user plane gateway (67) and a wireless user equipment running a peer-to-peer application (62). According to a further step of the method content loaded to the peer-to-peer application is cached in a cache memory of the caching entity. Furthermore information is stored, which indicate the wireless user equipment to which the cached content is loaded to associate the cached content with the wireless user equipment. The method also comprises intercepting a request on the point-to-point connection, where the request is a request for delivery of content from the wireless user equipment. Furthermore the method comprises a step of delivering the requested content, without involving from the wireless user equipment, if the requested content is cached in the cache memory and the cache memory also includes information indicating that the requested content has been loaded to the wireless user equipment.

Advantages and further features of embodiments of the present invention will become apparent when reading the following detailed description in conjunction with the drawings.

DETAILED DESCRIPTION

Figure 1:
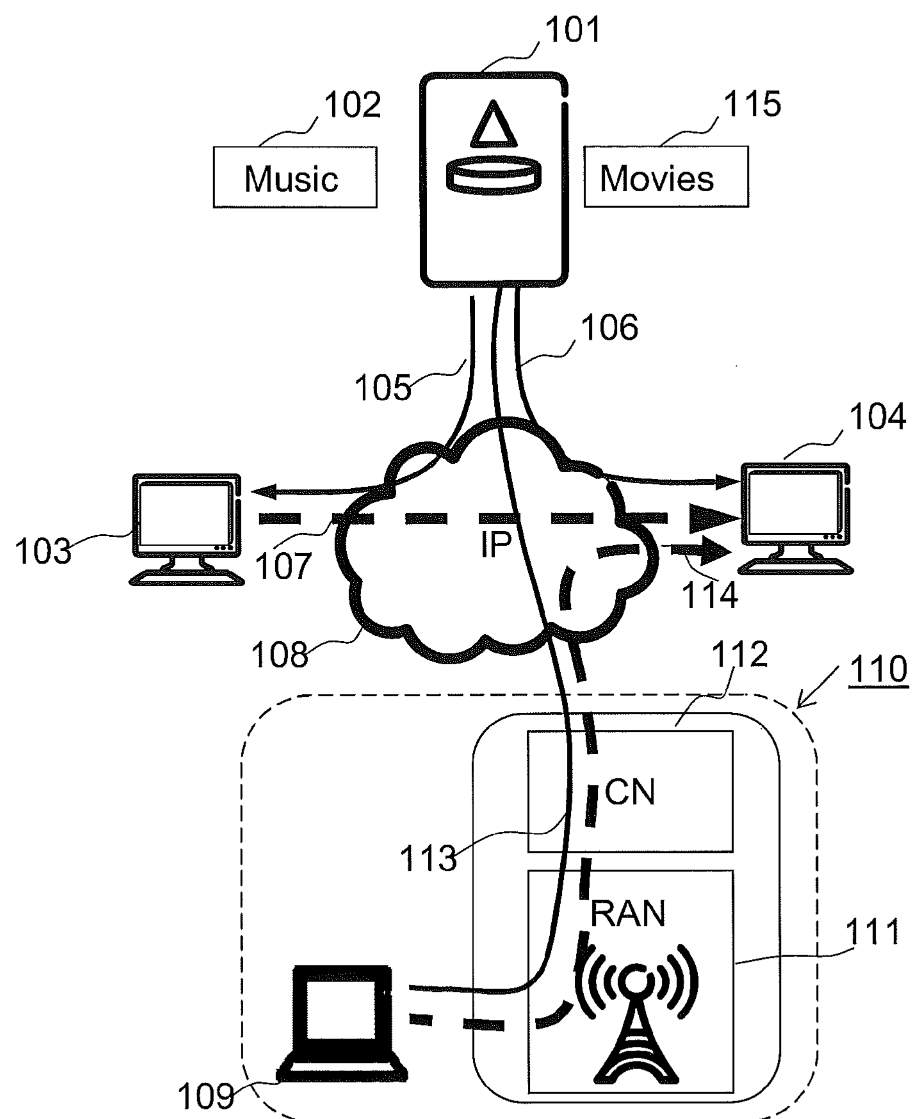
FIG. 1 is a schematic block diagram illustrating content distribution in a communication system based on peer-to-peer techniques.

Embodiments will now be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art.

According to embodiments which will be explained in further detail below, an entity for caching content related to P2P sharing is introduced in a wireless communication network. This entity will herein be referred to as a "reverse cache". The reverse cache functions as a virtual seed for one or several wireless UEs.

"Seed" or "seeder" are terms which are used to refer to a peer that offers a piece of content for upload. The action of uploading content to other peers can analogously be referred to as seeding.

The reverse cache is able to, on behalf of a wireless UE, handle seeding towards other UEs in the wireless communication network as well as other users outside the wireless communication network. Therefore, the reverse cache relieves the wireless UEs from needing to assist in the P2P content distribution as the reverse cache is able to take care of this for these wireless UEs.

A main principle of the reverse cache is that it functions on "UE-level". This means that content is stored in the reverse cache with information indicating the UE(s) that hold the content. Generally, the reverse cache performs cache play-out only in a case when a requested content is in the reverse cache with an indication that the UE to which the content request is sent to also holds the content. Thus it can be said that the reverse cache acts as a virtual seed on behalf to the UE.

The reverse cache typically functions on a so-called point-to-point connection between a wireless UE and gateway acting as a mobile network user plane gateway, also referred to as a packet switched (PS) domain user plane gateway, such as e.g. a Serving GPRS Support Node (SGSN), a Gateway GPRS Support Node (GGSN), a Packet Data Network Gateway (PDN-GW) or a combination of a Serving Gateway and a PDN Gateway (S-GW/PDN-GW). This means that in a basic case the reverse cache functions in the downlink direction on the point-to-point connection that identifies the UE to which the content request is targeted. The requested content is compared against information stored in the reverse cache that indicates the UE(s) that do hold the requested content.

Optionally the reverse cache can function also in the uplink direction, i.e. in a case when the peer requesting content is also a mobile UE. There are different alternatives for how the reverse cache may operate in the uplink direction. According to one alternative, the reverse cache intercepts a content request from the mobile UE in the uplink and based on the intercepted request determines a point-to-point connection on which the request would have been received in the downlink if it had not been intercepted already in the uplink. The reverse cache then treats the intercepted request in the same way as it would with a content request received in the downlink direction as described above. According to another alternative, the reverse cache is able to intercept a content request in the uplink. If the reverse cache caches the content requested by the intercepted request, the requested content is delivered to the mobile UE that requested the content. Thus, according to this alternative the requested content is delivered if the content is cached in the reverse cache irrespective of whether or not the reverse cache also has stored information indicating that the requested content is held by the UE towards which the content request is directed.

Figure 3:
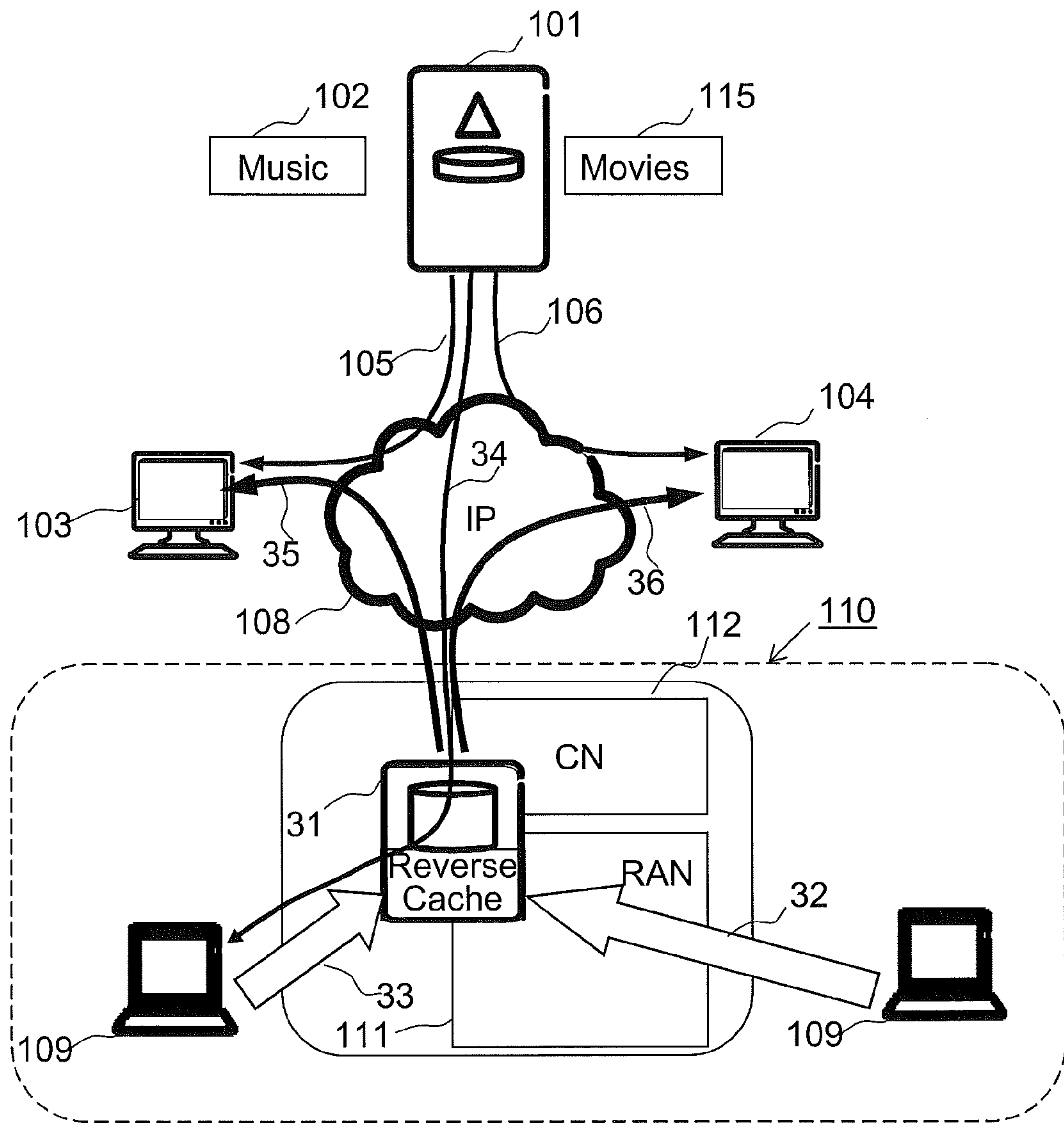
FIG. 3 is a schematic block diagram illustrating caching in a communication system according to an exemplary embodiment of the invention.

FIG. 3 is a schematic block diagram illustrating use of an entity 31 for caching content related to P2P sharing, which is referred to herein as a reverse cache as mentioned above. FIG. 3 illustrates the reverse cache 31 in action on high level.

The relationship between the reverse cache and the UE(s) 109 that it serve(s) will be explained in further detail below. FIG. 3 illustrates implementation of the reverse cache 31 in a communication system corresponding to those illustrated in FIG. 1 and FIG. 2 which have been explained above. The same reference numerals are used for corresponding features in the different figures and such features which have already been explained in connection with FIG. 1 or FIG. 2 will not be explained further here. The thick arrows 32, 33 from the mobile users, i.e. from the wireless UEs 109, to the reverse cache 31 indicate that reverse cache 31 is about moving content that is normally placed in the UEs 109 higher up in the wireless communication network 110. The reverse cache is located such that, when the wireless UE 109 downloads content from the media server 101, the reverse cache can intercept the download and cache a copy of the downloaded content. Accordingly the content that is downloaded to the UE 109 from the media server 101 can pass via the reverse cache as is illustrated by an arrow 34. Arrows 35 and 36 indicate that the reverse cache takes care of the content distribution on behalf of the UEs 109.

It is however important to understand that the arrows 32 and 33 only indicate a logical direction for moving content. There are two different typical scenarios according to which the reverse cache 31 caches content. In a first scenario the reverse cache 31 caches the content when it is being forwarded to a UE 109 the very first time as illustrated by the arrow 34. According to this first scenario, there is no need for the UE 109 to send the content at all in the uplink direction as the content is recorded in the reverse cache 31 when it is forwarded to the UE 109. According to a second scenario the content is stored in the UE 109 but is not yet stored in the reverse cache. This second scenario may be referred to as a "reverse cache miss" and will be further explained below in connection with FIG. 6. In this scenario the reverse cache 31 can cache the content when it is sent in the uplink direction i.e. once UE 109 is performing media distribution towards another device. Thus the reverse cache can help the UE 109 with the media distribution at another occasion when the same content is requested such that the UE 109 is not required to send the content in the uplink at this other occasion. The second scenario can arise for example when a UE has received and stored the content by means of some other access technology that bypasses the reverse cache 31, like a fixed access technology, or via a part of the wireless network communication network that bypasses the reverse cache 31.

The reverse cache 31 typically uses deep or shallow packet inspection to identify P2P content and/or content requests.

Figure 2:
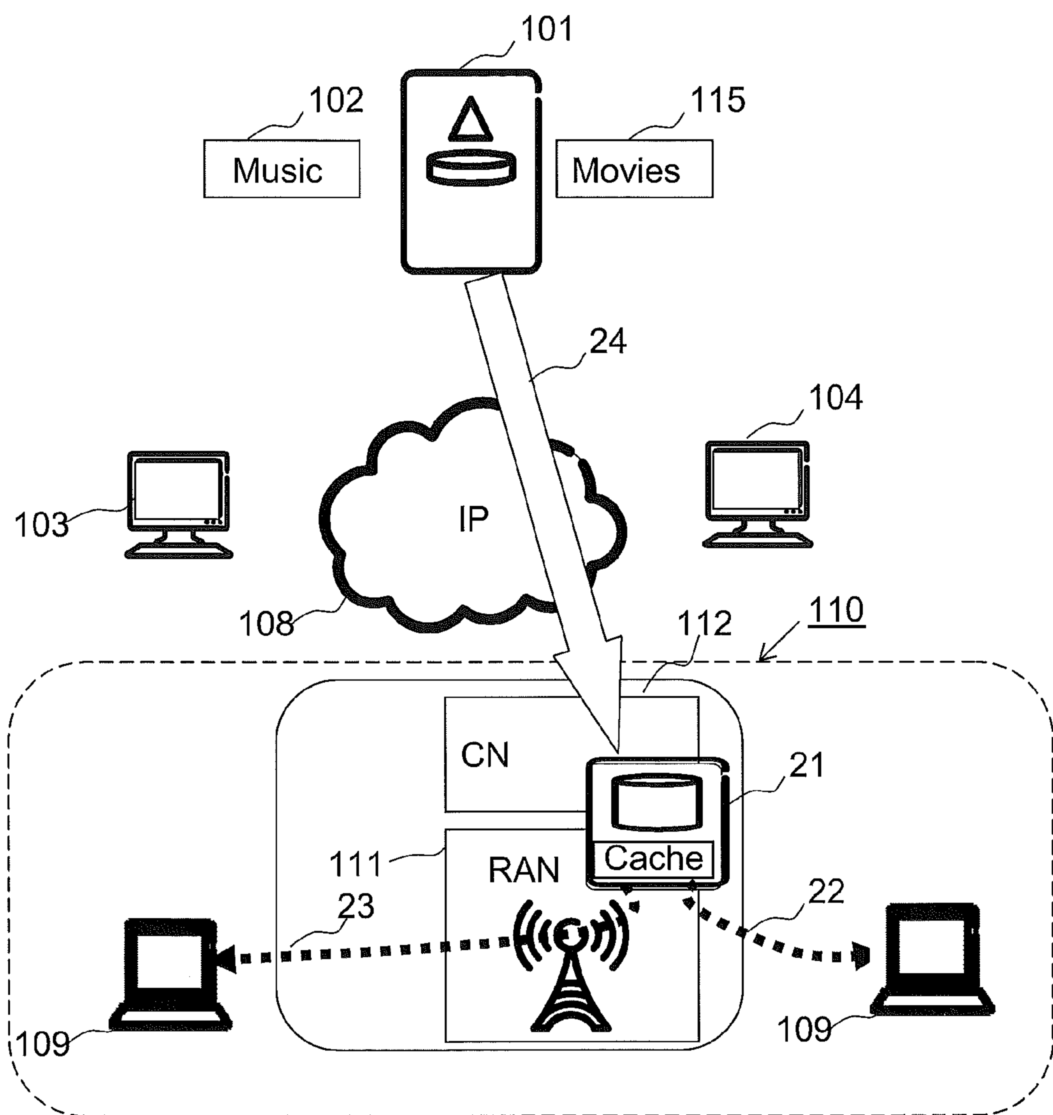
FIG. 2 is a schematic block diagram illustrating caching in a communication system according to prior art in connection with media services.

Now some differences between the cache 21 as illustrated in FIG. 2 and the reverse cache 31 as illustrated in FIG. 3 will be discussed. One important difference is that the cache 21 protects transmission links above its placement, e.g. links above RAN 111 towards the CN 112 and the IP network 108. In contrast the reverse cache 31 protects the links below its placement, e.g. the mobile uplink and the last mile transmission links just above the radio base stations (provided that the reverse cache is placed above the radio base stations). Another important difference is that the cache 21 provides performance boosts below itself and the reverse cache 31 provides performance boosts above itself. The main reason for the performance boost is that the requested content is returned from a closer position decreasing the transmission delay.

The reverse cache 31 described herein is configured to cache content related to peer-to-peer sharing in a wireless communication network. The cache 21 can be configured to cache any type of content closer to the users.

A further difference between the cache 21 and the reverse cache 31 is that the reverse cache has a certain relation to the UE(s) that it serves, i.e. the reverse cache is so-called "UE-based". This means that the reverse cache, aside from the actual content, also holds information about which UE(s) is/are holding a specific content. A cache hit in the reverse cache 31 will thus generally take place only in the case when a) the requested content is in the reverse cache 31 and b) the reverse cache 31 has information that indicate that the requested UE holds the requested content. Thus the reverse cache 31 is able to act on behalf of the UE(s) that it serves with respect to seeding. A main principle is that the request for the content is received on a point-to-point connection between the UE 109 and a gateway acting as a mobile network user plane gateway, e.g. a packet switched (PS) domain user plane gateway. The reverse cache is configured to intercept this point-to-point connection to thereby intercept content requests transmitted on the point-to-point connection. If a content request is intercepted in the downlink direction, the point-to-point connection on which the content request was intercepted identifies the UE from which the content is requested from and the reverse cache can use this information to check if the requested content is stored in the reverse cache 31 for this UE as will be explained in further detail below.

To further illustrate some differences between the cache 21 as illustrated in FIG. 2 and the reverse cache 31 as illustrated in FIG. 3, it will be now be explained how embodiments of the different caches may operate in some typical exemplary scenarios.

Figure 4:
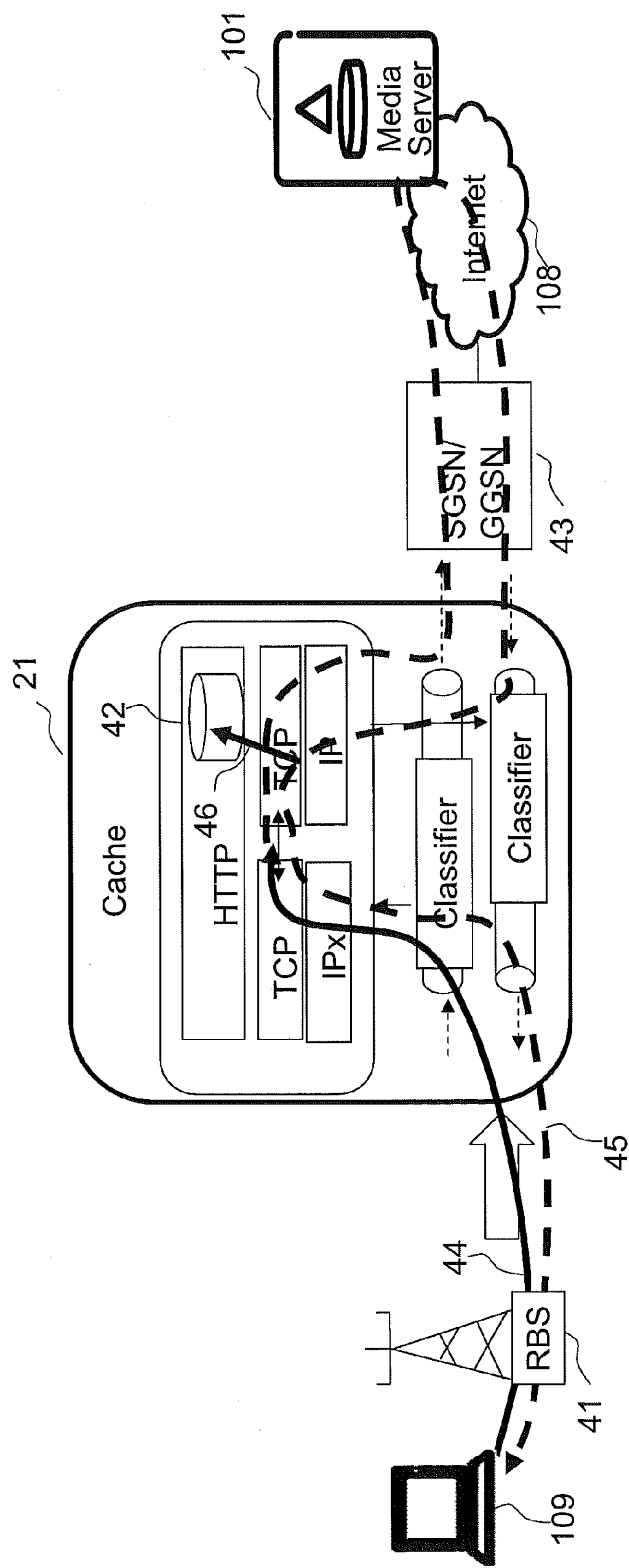
FIG. 4 is a schematic block diagram illustrating a cache miss in a conventional cache of a wireless communication network.
Figure 5:
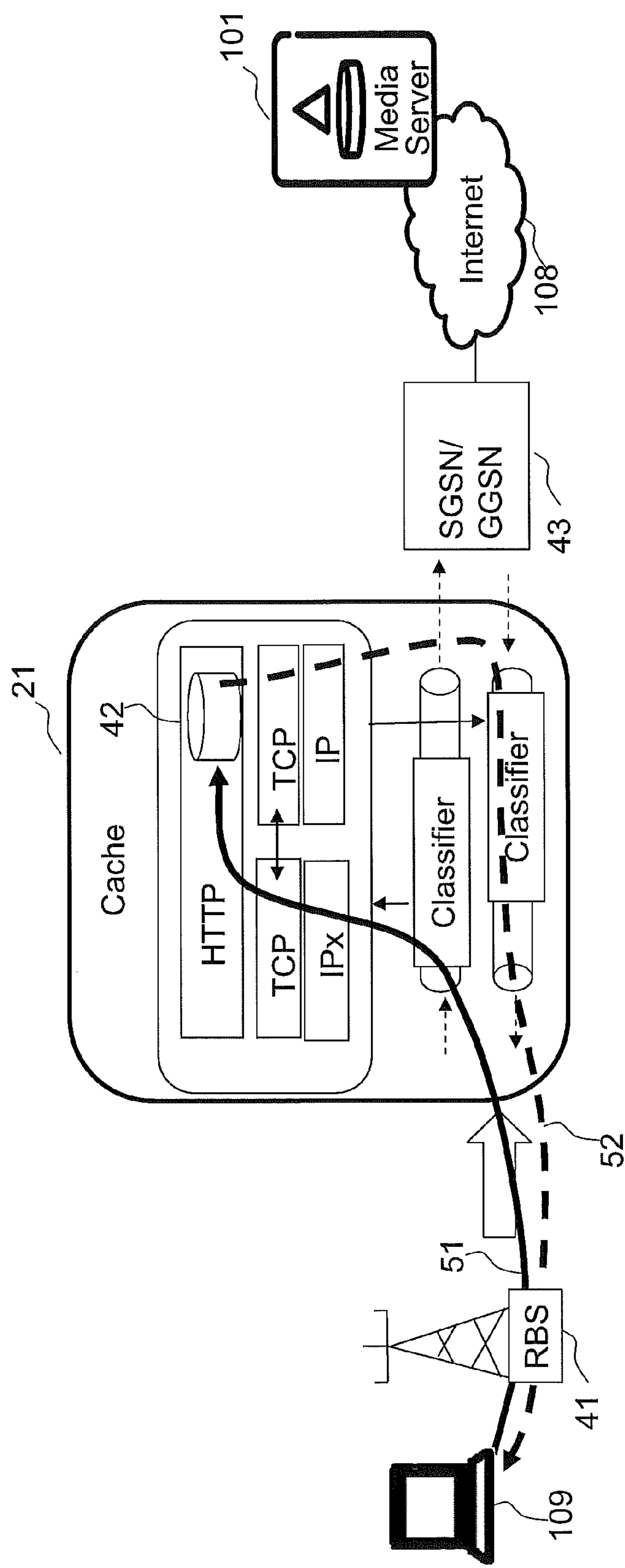
FIG. 5 is a schematic block diagram illustrating a cache hit in conventional cache of a wireless communication network.

FIGS. 4 and 5 are schematic block diagrams illustrating operation of the cache 21 in exemplary cases. FIG. 4 illustrates a case with a cache-miss i.e. when the content requested by the UE 109 cannot be returned to the UE 109 from the cache 21. A solid arrow 44 illustrates a content request that is sent from the UE 109 via a radio base station (RBS) 41 to the cache 21. In the cache 21 it is examined if the requested content is stored in a cache memory 42. In this exemplary case the requested content is not present in the cache memory 42 so the requested content is fetched to the UE 109 from the media server 101 via a SGSN/GGSN 43 and the Internet 108, which is illustrated by a dashed arrow 45. In addition, an arrow 46 is shown to illustrate that the content is recorded in the cache memory 42 when it is returned from the media server 101.

FIG. 5 illustrates a case with a cache-hit, i.e. when the content requested by the UE 109 can be returned to the UE 109 from the cache 21. A solid arrow 51 illustrates a content request that is sent from the UE 109 via the radio base station (RBS) 41 to the cache 21. In the cache 21 it is examined if the requested content is stored in the cache memory 42. In this exemplary case the requested content is present in the cache memory 42 so the requested content is returned to the UE 109 from the cache 21, which is illustrated by a dashed arrow 52.

Figure 6:
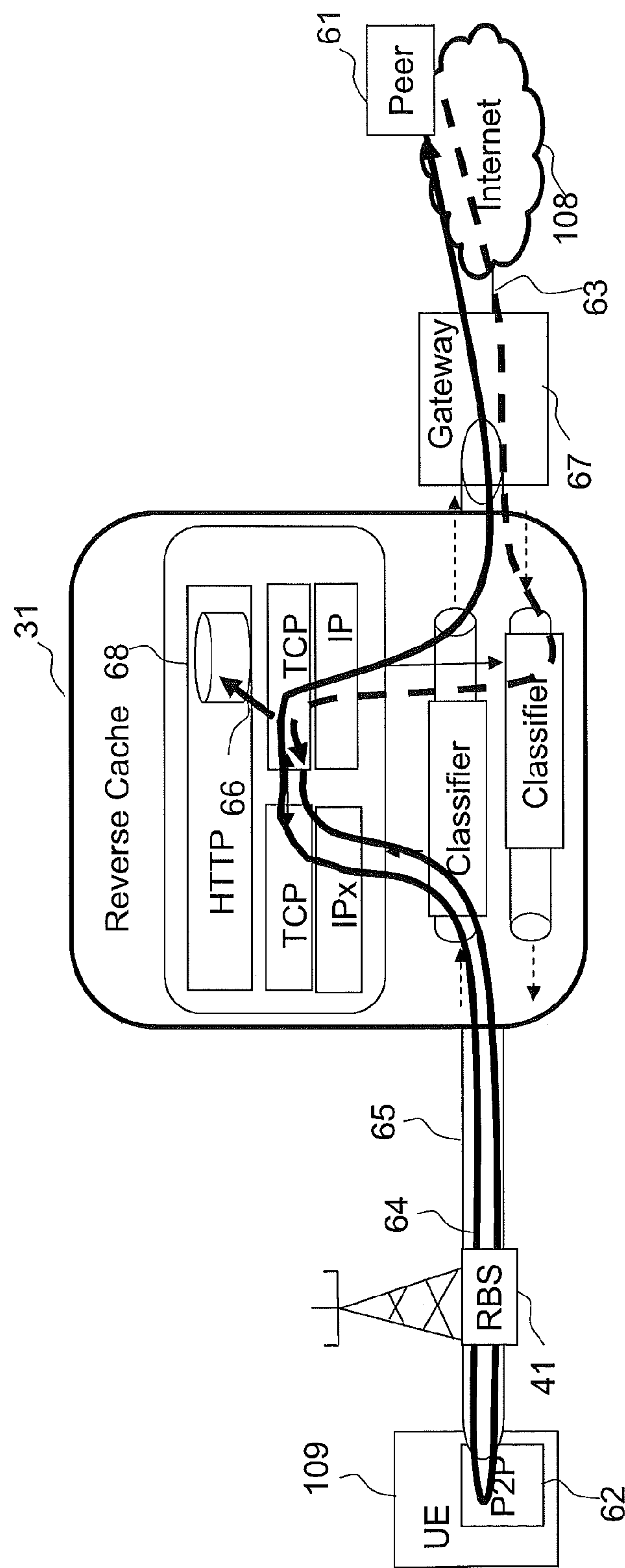
FIG. 6 is a schematic block diagram illustrating a cache miss in an entity for caching content cache according to an embodiment of the present invention.
Figure 7:
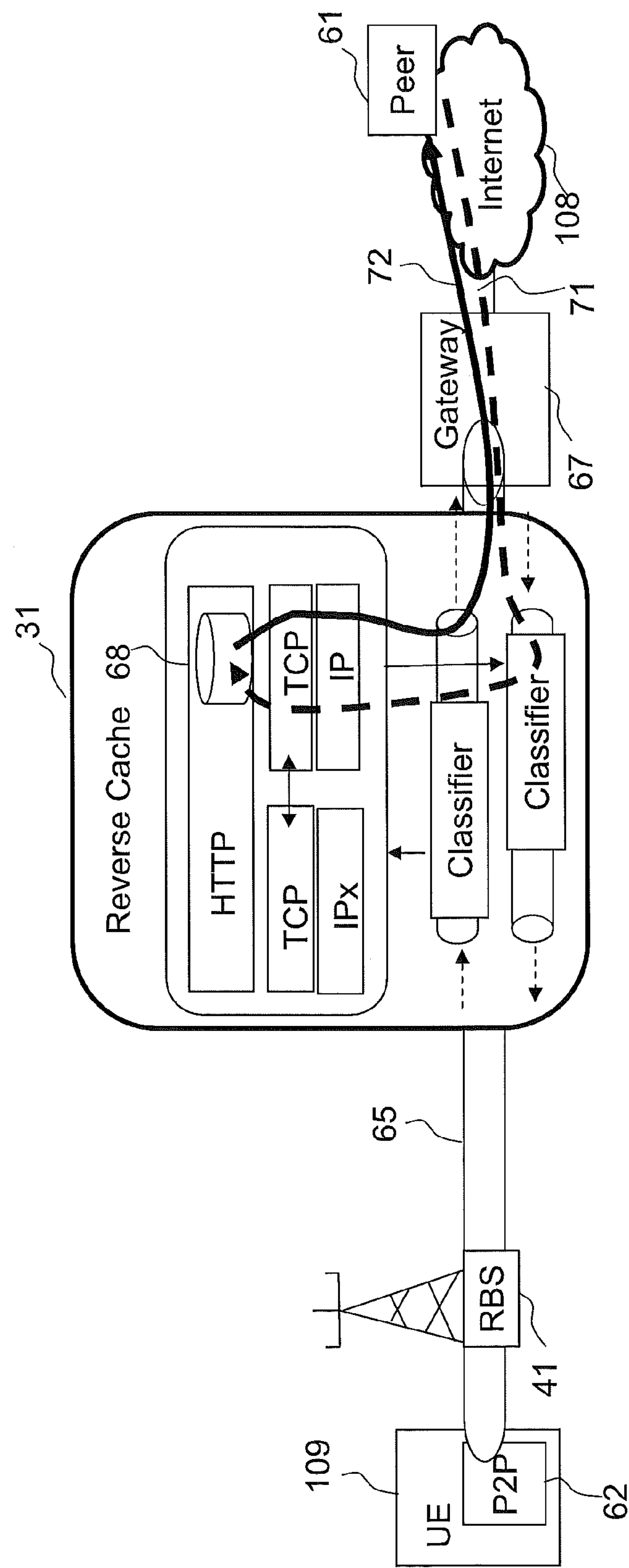
FIG. 7 is a schematic block diagram illustrating a cache hit in an entity for caching content according to an exemplary embodiment of the present invention.

FIGS. 6 and 7 are schematic block diagrams illustrating operation of the reverse cache 31 in exemplary cases. FIG. 6 illustrates a case with a cache-miss in the reverse cache 31, i.e.

when content requested by a peer 61 in the Internet 108 is not returned from the reverse cache 31. In the scenario illustrated in FIG. 6 the peer 61 is requesting content from the UE 109 which is running a P2P application 62. The reverse cache 31 is placed such that it can intercept a point-to-point connection 65 between the UE 109 and a gateway 67 acting as mobile network user plane gateway. In FIG. 6 it is schematically illustrated that the reverse cache 31 is located between the RBS 41 and the gateway 67. It is however possible to place the reverse cache 31 anywhere between the RBS 41 and the gateway 67, including integrated with either the RBS 41 or the gateway 67. When the peer 61 requests content from the UE 109 a content request is sent on the point-to-point connection 65. The content request is intercepted by the reverse cache 31 as illustrated by a dashed arrow 63. The reverse cache 31 examines if the requested content is stored in a cache memory 68 and if the content is indicated as being stored for the UE 109. In this exemplary case it is assumed that a cache-miss occurs either because the requested content is not in the cache memory 68 at all or because the requested content is in the reverse cache but is not indicated as being stored for the UE 109 to which the peer 61 sent the content request. When the cache-miss occurs in the reverse cache 31, the content request is forwarded to the UE 109 on the point-to-point connection 65. A solid arrow 64 illustrates that the content request is forwarded to the UE 109 and that the requested content is returned to the peer 61 via the point-to-point connection 65. In addition, an arrow 66 illustrates that the requested content is recorded in the cache memory 68 in the reverse cache 31 when returned from the UE 109, along with information indicating that the content is stored for the UE 109.

FIG. 7 illustrates a case of a cache hit in the reverse cache 31, i.e. when the content requested by the peer 61 in the Internet 108 can be returned directly from the reverse cache 31. A dashed arrow 71 illustrates the content request which is sent from the peer 61 on the point-to-point connection 65 and which is intercepted by the reverse cache 31. The reverse cache 31 examines if the requested content is stored in the cache memory 68 and is indicated as associated with the UE 109. In this exemplary case it is assumed that a cache hit occurs. The cache hit happens when the reverse cache memory 68 holds the requested content and also has an indication that the requested content is stored for the UE 109 targeted with the request. A solid arrow 72 illustrates how the requested content is returned to the peer 61 from the reverse cache 31.

The point-to-point connection 65 between the gateway 67 and the UE 109 comprises different tunnels and is different for different radio access technologies as exemplified in the following:

- In a Long Term Evolution (LTE) scenario, a first part of the point-to-point connection 65 is a GTP-U tunnel between the RBS 41 and the gateway. In LTE, the RBS 41 would be referred to as an evolved NodeB (eNB) and the gateway 67, could be a S-GW/PDN-GW. If the S-GW and PDN-GW are divided into two different nodes, then either a GTP-U or Mobile IP tunnel is used between these two nodes in addition to the GTP-U tunnel between the S-GW and the eNB. Furthermore, a radio access bearer between the eNB and the UE 109 is a final component of the point-to-point connection 65.
- In a Wideband Code Division Multiple Access (WCDMA) scenario, a first part of the point-to-point connection 65 is a GTP-U tunnel between a Radio Network Controller (RNC) and a GGSN (which corresponds to the gateway 67) in case of One/Direct Tunnel deployment in which case the user plane does not pass via the SGSN. If One/Direct Tunnel is not deployed the GTP-U tunnel is between the RNC and the SGSN and between the SGSN and the GGSN. Furthermore, a radio access bearer between the RNC and the UE is the final component of the point-to-point connection 65. However, as the radio access bearer is encrypted the reverse cache 31 can normally only be placed between the RNC and the GGSN (including integrated with these nodes) unless the encryption is moved further out to the RBS 41, referred to as NodeB (NB) in WCDMA.
- In a GSM scenario, a similar concept as explained above for the WCDMA scenario exists between the SGSN and the GGSN. A GTP-U tunnel is terminated in the SGSN and then other tunnelling protocols take over between the SGSN and the UE. In this case the communication between the SGSN and the UE is encrypted and the reverse cache can normally only be placed between the SGSN and the GGSN (including integrated with these nodes) unless the encryption is moved further out to a Base Station Controller (BSC).

An illustration of how the point-to-point connection 65 may be established in the LTE example when the UE requests an additional PDN-connection is illustrated in the standard document 3GPP TS 23.401 V10.2.1, figure 5.10.2-1. In this case the GTP-U tunnel is established between the eNB and the S-GW/PDN-GW. If the reverse cache would be placed in the eNB (or somewhere between the eNB and the S-GW) then the reverse cache can store an association between a permanent UE identifier and the established GTP-U part of the point-to-point connection 65. This association can then be used when information is stored in the reverse cache 31 to indicate a specific UE which is associated with a particular content.

Figure 8:
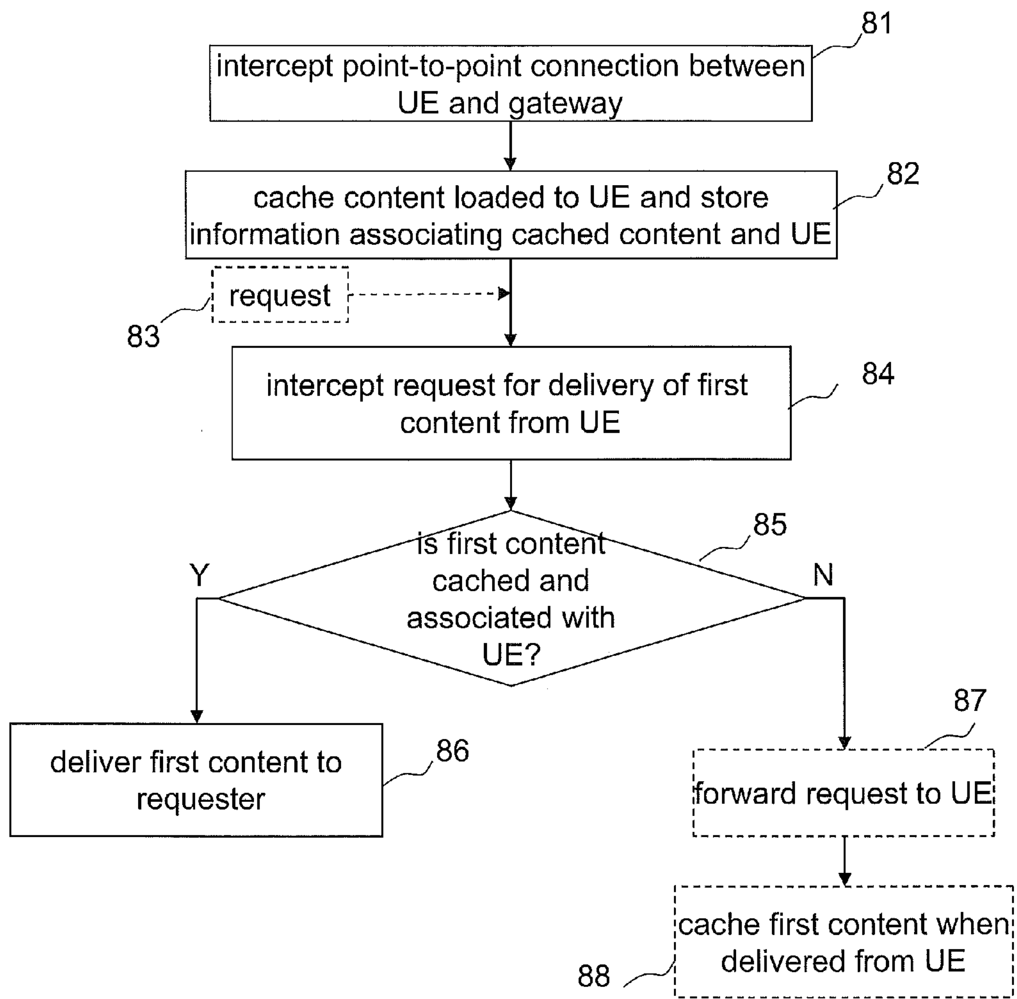
FIG. 8 is a flow diagram illustrating a method according to an exemplary embodiment of the invention.

FIG. 8 is a flow diagram illustrating a method according to an exemplary embodiment of the invention. The method is carried out in an entity for caching content related to P2P sharing in a wireless communication network, such as the reverse cache 31 described above. Accordingly when describing the method illustrated in FIG. 8 it will be described as if it was carried out in the reverse cache 31 in a scenario such as illustrated in FIG. 6 or FIG. 7 using reference numerals illustrated in FIGS. 6 and 7. In a step 81 the point-to-point connection 65 between the gateway 67 and the UE 109 is intercepted. The UE 109 is running a P2P application 62. In a step 82, content loaded to the peer-to-peer application 62 is stored in the cache memory 68 of the caching entity 31, and information indicative the UE 109 is stored to associate the cached content with the UE 109. Step 82, i.e. storing of content in the reverse cache 31 may, as explained above, be carried out in connection with the first time that the content is loaded to the P2P application or at a point later in time, such as the first time that the UE shares the content with another peer. A request 83 for delivery of a first content from the UE 109 is intercepted on the point-to-point connection 65 in a step 84. The requested first content is delivered, without involving the UE 109, in a step 86, if the requested first content is cached in the cache memory 68 and the cache memory 68 includes information indicating that the requested first content has been loaded to the UE 109. In FIG. 8 it is illustrated that the conditions for carrying out the step 86 are examined in a step 85. It is also illustrated in FIG. 8 optional steps 87 and 88 to be carried out if the conditions for performing the step 86 are not fulfilled. If the first content is not cached in the cache memory 68 and/or not associated with the UE 109, then the request 83 is forwarded to the UE 109 in the step 87. If the UE 109 then delivers the first content to the requesting peer the reverse cache may intercept and cache the first content when it passes the reverse cache, step 88. When caching the first content, the reverse cache should also store information associating the first content with the UE 109. The step 88 is illustrated as a separate step here, but it can alternatively be viewed as a special case of the step 82. As mentioned above the step 82 may be performed in connection with content being loaded to the UE for the first time or in connection with previously loaded content being delivered from the UE. In contrast the step 88 concerns only the case of caching content which has previously been loaded to the UE when that content is delivered from the UE.

Figure 9:
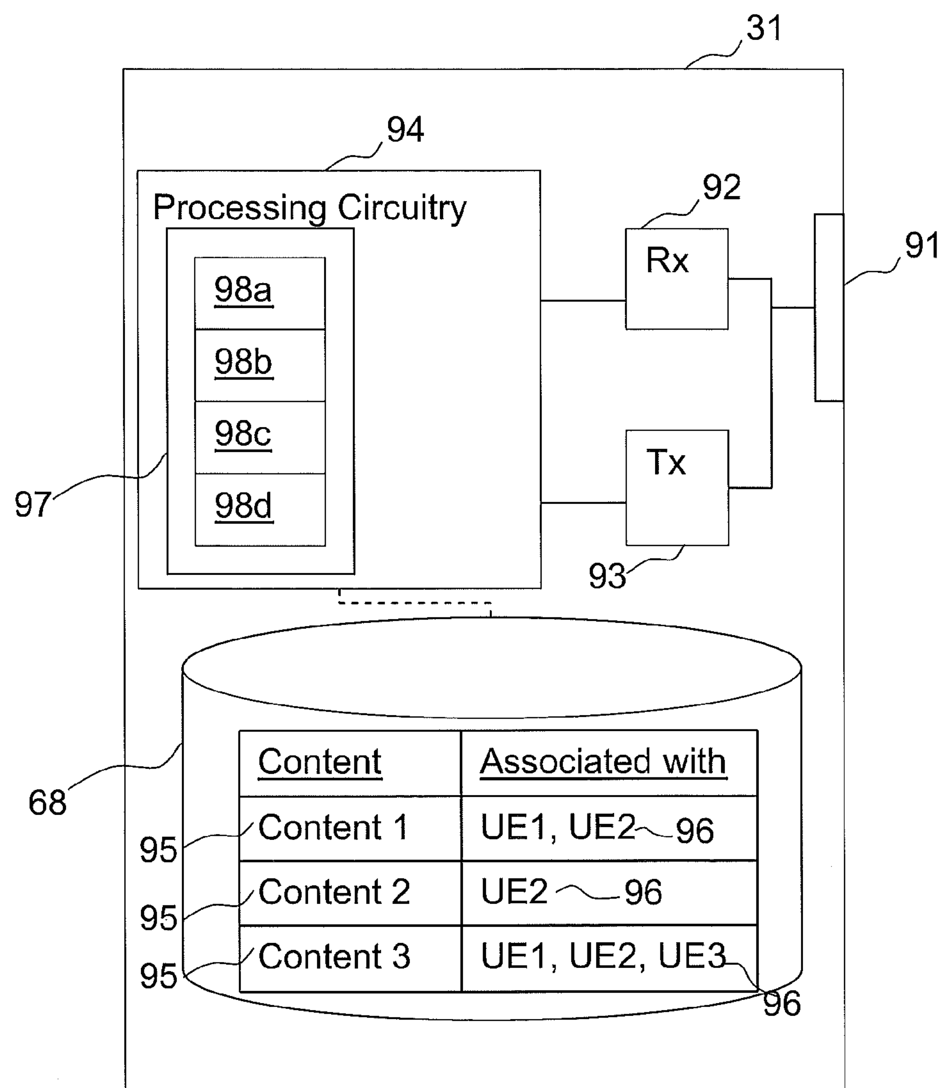
FIG. 9 is a schematic block diagram illustrating an entity for caching content according to an exemplary embodiment.

FIG. 9 is a schematic block diagram illustrating an entity for caching content according to an exemplary embodiment, i.e. an exemplary embodiment of the reverse cache 31. The embodiment of the reverse cache 31 illustrated in FIG. 9 comprises interface circuitry 91 which is configured such that the reverse cache is able to e.g. intercept the point-to-point connection 65 and transmit and receive content and content requests as described above. The reverse cache 31 also comprises a receiver 92 and a transmitter 93 or alternatively combined transceiver for transmitting and/or receiving content and content requests as described above. Furthermore the reverse cache comprises a cache memory 68 and processing circuitry 94 configured to control the above described operations of the reverse cache 31. The processing circuitry 94 may include or be configured to execute one or several computer programs 97 comprising computer program submodules. In FIG. 9 four exemplary computer program submodules are illustrated, namely a submodule 98*a* for controlling interception of content requests, a submodule 98*b* for controlling storing of content in the cache memory 68, a submodule 98*c* for controlling searches for requested content in the cache memory and a submodule 98*d* for controlling delivery of requested content in case of a cache hit. It is however to be understood that other or different submodules than the submodules 98*a*-98*d* may be used to implement a reverse cache with the functions according to the different embodiments described herein.

FIG. 9 also shows a schematic illustration of an exemplary embodiment of associations between content 95 stored in the cache memory 68 and the UE(s) for which the content is stored. The content 95 is the actual P2P content that is to be shared between peers. The content 95 may be associated with information 96 that identifies the UE(s) which are known to hold the content, thus creating an association between the different pieces of content and one or several UEs. Each piece of content may thus be associated with one or several identifiers, depending on whether the piece of content is held by one or several UEs. For example, International Mobile Subscriber Identity (IMSI) could be used as information 96 to identify a UE provided that the IMSI is made available to the reverse cache. Another option would be the IP-address of the UE if these addresses are static between different sessions and network attachments. In another example, the information 96 identifying a UE could be multiple IP-addresses if the UE holds many simultaneous IP-addresses. Other examples could be International Mobile Equipment Identity (IMEI) or MSISDN if these identifiers are made available to the reverse cache.

FIGS. 6 and 7 illustrate scenarios when the peer 61 requesting content is "above" the reverse cache 31 i.e. in the Internet 108 in these examples. Similar principles would also apply if the peer 61 requesting content is another wireless UE. Different alternative embodiments for such a scenario will be explained below and the UE holding the requested content will be referred to as a first UE (UE-1) and the UE requesting the content will be referred to as a second UE (UE-2).

According to an exemplary embodiment the request for the content would be passed from the UE-2 to a gateway, such as a GGSN where the UE-2 has its IP point-of-presence. Then normal GGSN operations would identify that the request is really for the UE-1 holding the content. Thus the request would be forwarded back to the RAN and the reverse cache 31 would see the request and check if it holds the requested content associated with the UE-1.

A cache miss would occur if the reverse cache 31 identifies that it does not hold the requested content or that the requested content is in the reverse cache but without an indication that the requested content is stored for the UE-1. Then the content request would be forwarded to and fulfilled by the UE-1. The reverse cache can also record the requested content, along with an indication that it is stored for UE-1, when the UE-1 delivers the requested content to UE-2, again via the GGSN.

A cache hit would occur if the reverse cache 31 identifies that it holds the requested content together with an indication that the content is held for UE-1. Then the reverse cache would return the requested content to the UE-2, again via the GGSN and without forwarding the request to the UE-1.

According to an alternative embodiment functionality of the cache 21 and the reverse cache 31 is combined to provide benefits from both solutions. It is for example possible that the same content database is used by both the cache 21 and the reverse cache 31. This means that information stored in the database by the reverse cache 31 can also be used by the cache 21 in its operations and vice versa. In addition, large synergies can be achieved as both these functions need very similar functionality. For example the content database could be shared as mentioned and furthermore deep packet inspection and traffic interception are functionality that could be shared by the reverse cache 31 and a the cache 21.

An embodiment of a reverse cache which incorporates some functionality from the cache 21 may also change the handling of wireless UEs requesting content. In the above described exemplary embodiment with the UE-1 and the UE-2, information is transmitted towards UEs via the GGSN. However, the content requested by UE-2 may alternatively be returned to the UE-2 directly from the combined cache/reverse cache or from the UE-1 without GGSN involvement.

This case would be similar to the scenario illustrated in FIG. 5. The content request would thus be intercepted by the reverse cache in the uplink direction. Two alternative embodiments of a method in the reverse cache to handle this uplink scenario will be explained in connection with FIGS. 10 and 11.

Figure 10:
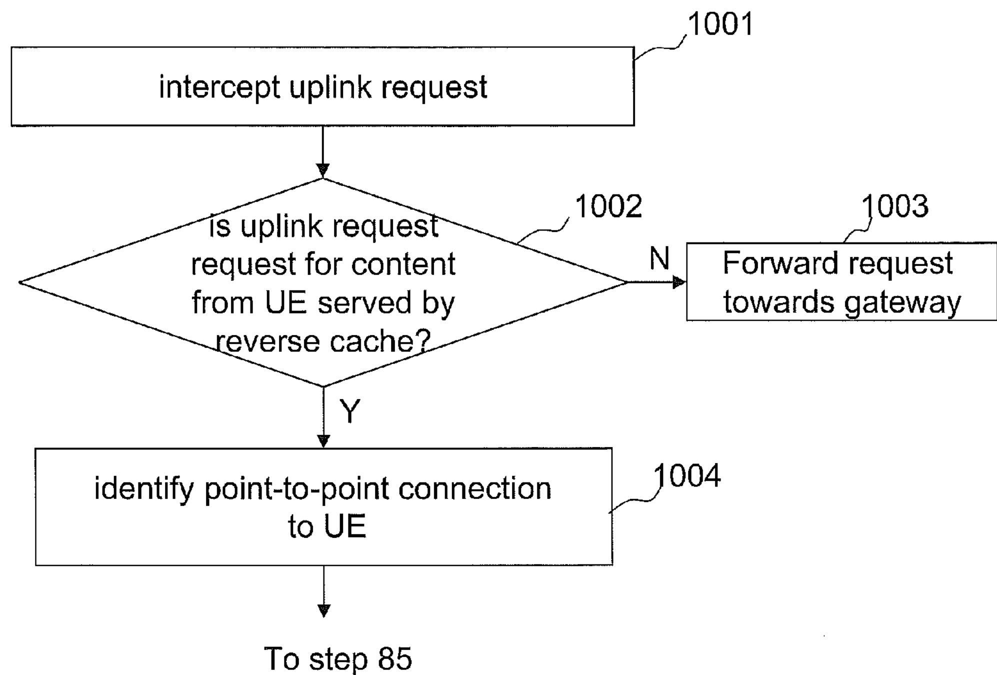
FIG. 10 is a flow diagram illustrating an alternative embodiment of a method of performing caching operations related to peer-to-peer sharing.

FIG. 10 illustrates a method according to which a content request which is intercepted in the uplink direction to a large extent is treated in the same way as a content request which is intercepted in the downlink direction as described in connection with FIG. 8. The reverse cache intercepts the content request from e.g. UE-2 in the uplink direction in a step 1001. It is thereafter to be examined if conditions for a cache hit in the reverse cache are fulfilled. However if the same conditions for a cache hit are to be applied as in the step 85 described, this means that the reverse cache needs to identify the requested UE (i.e. UE-1) already in the uplink when the request is received from UE-2. Accordingly the reverse cache examines if request for content is targeted to a UE (UE-1) that is served by the reverse cache in a step 1002. If the reverse cache is not serving UE-1 the uplink request is forwarded to the gateway 67 in a step 1003. However if the reverse cache is serving UE-1 the point-to-point connection to the UE-1 is identified in a step 1004. Thereafter the uplink request can be treated as if it had been received on the identified point-to-point connection to the UE-1 in the downlink direction. Thus the method can continue to the step 85 and subsequent steps as described in FIG. 8. Thus, according to this embodiment there are some differences when the content request is intercepted in the uplink direction compared to when it is intercepted in the downlink direction. When intercepted in the downlink direction, the content request is on the point-to-point connection for the UE holding the content (i.e. UE-1). However, in the uplink case the content request is intercepted on the point-to-point connection for the UE requesting the content (UE-2). So the reverse cache needs to analyze the content request and can, based on for example destination IP address in the request, identify the UE holding the content (i.e. UE-2). Then a similar "UE-specific" content storage check can be made as described in connection with FIG. 8. If this check indicates that the reverse cache holds the requested content for UE-1 (in this case), then the requested content is returned directly to UE-2, i.e. without forwarding the uplink request to the gateway 67.

Figure 11:
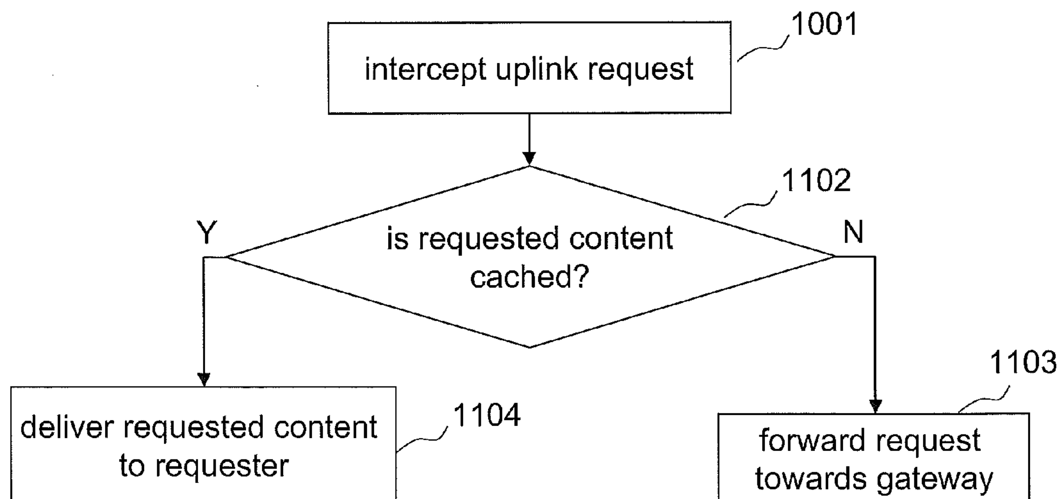
FIG. 11 is a flow diagram illustrating another alternative embodiment of performing caching operations related to peer-to-peer sharing.

According to the embodiment illustrated in FIG. 11 the content request which is intercepted in the uplink direction, step 1001 is treated differently than content requests which are intercepted in the downlink direction. In a step 1102 it is examined if the requested content is stored in the reverse cache. If the requested content is stored it is returned to the requesting UE, i.e. UE-2. If the reverse cache does not hold the requested content the uplink request is forwarded to the gateway 67 in a step 1103. Thus according to this embodiment the reverse cache just checks if the content requested by UE-2 is stored in the reverse cache for any UE (i.e. the information 96 indicating the UE(s) which has loaded the content is not checked). If this is the case then the requested content is returned directly to UE-2 in a step 1104.

Other combinations of functionality from the reverse cache 31 and the cache 21 may be contemplated. In certain applications it may e.g. be of interest to modify the requirements for a cache hit in the reverse cache by letting a cache hit occur in the reverse cache holds the requested content and information indicating that at least one UE in a pre-defined group of UEs holds the requested content. Thus the reverse cache would assist with UE seeding on a group level rather than per individual UE.

In applications that implement both functionality as described for the cache 21 and functions as described for the reverse cache 31, the cache 21 is generally placed in the RAN 111. It is foreseen that great product synergies could be achieved by integrating both the cache 21 and reverse cache 31 in the same product. Therefore, it is expected that the reverse cache would generally also be placed in the RAN 111. An alternative solution could be to place the cache 21 in the RAN 111 and the reverse cache 31 in CN 112 as this would also minimize the uplink transport needs between RAN 111 and CN 112. In this case, two separate caches are needed.

From the description above it is apparent that an advantage of embodiments described herein is that uplink data transmissions in the wireless communication network relating to P2P sharing is minimized, saving uplink capacity and reducing power consumption as the content is rarely, or in best cases never, sent over the mobile uplink. Therefore, the end user's experience related to battery lifetime of the wireless UE is improved.

A further advantage of some embodiments described herein further is that, a reverse cache of an operator of a wireless communication network can act as a part of the P2P service boosting performance also for other than the operator's own users, e.g. users with fixed access. The same benefit is also achieved for the operator's own users in the wireless communication network. This is the case since the reverse cache provides shorter latency towards all other users compared to the case when the content is retrieved from a wireless UE and the mobile uplink is included in the transmission path.

Another advantage of embodiments described herein is that the same media distribution application version can be used on all device types, including fixed and mobile devices. As described above seeding can be a problem for mobile devices due to the limited bandwidth of the radio uplink. However if the reverse cache performs the seeding on behalf of the mobile device the problem with seeding in mobile devices is obviated.

Yet another advantage of embodiments described herein is that the reverse cache 31 can perform its operations in a transparent way without any changes needed to the existing P2P application signalling.

Another advantage is that the reverse cache will not generate uplink load (consume bandwidth) when there are no active UEs. The reason is that if the UE 109 in the wireless communication network does not have an active P2P application other users of the P2P service will not see the UE 109 as a potential seed and will not issue any content requests targeted for the UE 109. Accordingly the reverse cache will only act on content requests relating to UEs with active P2P applications. The reverse cache 31 is hence only active when there are active P2P users in the RAN 111.

In the drawings and specification, there have been disclosed typical embodiments and, although specific terms are employed, they are used in a generic and descriptive sense only and not for purposes of limitation, the scope of the invention being set forth in the following claims.

What is claimed is:

1. An entity for caching content related to peer-to-peer sharing in a wireless communication network, wherein the entity comprises processing circuitry, interface circuitry, a receiver, a transmitter and a cache memory, wherein:

said processing circuitry and interface circuitry are configured to intercept a point-to-point connection between a gateway acting as a mobile network user plane gateway and a first wireless user equipment running a peer-to-peer application;

said cache memory is configured to cache content loaded to said peer-to-peer application and to store information indicative of the first wireless user equipment to which the cached content is loaded to associate the cached content with the first wireless user equipment;

said receiver is configured to intercept a first request on the point-to-point connection for delivery of a first content from said first wireless user equipment; and said processing circuitry and said transmitter are configured to deliver the requested first content, without involving the first wireless user equipment, in response to when the requested first content is cached in said cache memory and said cache memory includes information indicating that the requested first content has been loaded to the first wireless user equipment;

wherein said processing circuitry and said transmitter are configured to forward said first request to the first wireless user equipment in response to when the requested first content is not cached in said cache memory or when said cache memory does not include any information indicating that the requested first content has been loaded to the first wireless user equipment, wherein said cache memory is configured to, when said first content is transmitted on said point-to-point connection from the first wireless user equipment in response to said first request, cache said requested first content and store information indicative of the first wireless user equipment to associate the cached first content with the first wireless user equipment, wherein said processing circuitry is configured to establish one or more GTP-U tunnels over the point-to-point connections, wherein said processing circuitry stores pairing information in the cache memory identifying pairing associations between identifiers of a plurality of wireless user equipment that include the first wireless user equipment and a second wireless user equipment and respective identifiers of the one or more GTP-U tunnels, and wherein said processing circuitry is configured to respond to receipt of a request by using the pairing information stored in the cache memory to determine an identifier for one of the plurality of wireless user equipments which is associated with a respective one of the one or more GTP-U tunnels.

2. The entity according to claim 1, wherein said processing circuitry and said transmitter are configured to deliver the requested first content via said point-to-point connection to said gateway.

3. The entity according to claim 1, wherein said entity is configured to cache content loaded to a plurality of different wireless user equipments by intercepting a plurality of different point-to-point connections to peer-to-peer applications running on the plurality of different wireless user equipments.

4. The entity according to claim 1, wherein:

said processing circuitry is further configured to:

determine that the second request is a request for content delivery from said first wireless user equipment, and to identify said point-to-point connection associated with the first wireless user equipment; and the entity is configured to operate on the second request as if it had been intercepted on the identified point-to-point connection.

5. The entity according to claim 1, wherein said gateway operates as a Gateway GPRS Support Node, a Packet Data Network Gateway or a combination of a Serving Gateway and a PDN Gateway.

6. The entity according to claim 1, wherein said entity is comprised in a radio access network node.

7. The entity according to claim 1, wherein said entity is comprised in said gateway.

8. The entity according to claim 1, wherein said receiver is further configured to intercept a second request for content on an uplink from a second wireless user equipment; and wherein said processing circuitry and said transmitter are further configured to respond to the content requested by the second request not being presently cached in said cache memory by waiting to complete the second request until the content is cached in said cache memory and then delivering the content from the cache memory to the second wireless user equipment.

9. A method in a caching entity of a wireless communication network for performing caching operations related to peer-to-peer sharing, the method comprising:

intercepting a point-to-point connection between a gateway acting as a mobile network user plane gateway and a first wireless user equipment running a peer-to-peer application;

caching content loaded to said peer-to-peer application in a cache memory of the caching entity, and storing information indicative of the first wireless user equipment to which the cached content is loaded to associate the cached content with the first wireless user equipment;

intercepting a first request on the point-to-point connection for delivery of a first content from said first wireless user equipment;

delivering the requested first content, without involving the first wireless user equipment, in response to when the requested first content is cached in said cache memory and said cache memory includes information indicating that the requested first content has been loaded to the first wireless user equipment;

forwarding said first request to the first wireless user equipment in response to when the requested first content is not cached in said cache memory or when said cache memory does not include any information indicating that the requested first content has been loaded to the first wireless user equipment; and when said first content is transmitted on said point-to-point connection from the first wireless user equipment in response to said first request, caching said requested first content in said cache memory and storing information indicative of the first wireless user equipment to associate the cached first content with the first wireless user equipment;

establishing one or more GTP-U tunnels over the point-to-point connections;

storing pairing information in the cache memory identifying pairing associations between identifiers of a plurality of wireless user equipment that include the first wireless user equipment and a second wireless user equipment and respective identifiers of the one or more GTP-U tunnels, and responding to receipt of a request by using the pairing information stored in the cache memory to determine an identifier for one of the plurality of wireless user equipments which is associated with a respective one of the one or more GTP-U tunnels.

10. The method according to claim 9, wherein said delivery of the requested first content is via said point-to-point connection to said gateway.

11. The method according to claim 9, further comprising caching content loaded to a plurality of different wireless user equipments by intercepting a plurality of different point-to-point connections to peer-to-peer applications running on the plurality of different wireless user equipments.

12. The method according to claim 9, further comprising:

determining that the second request is a request for content delivery from said first wireless user equipment;

identifying said point-to-point connection; and operating on the second request as if it had been intercepted on the identified point-to-point connection.

13. The method according to any of claim 9, wherein said gateway operates as a Gateway GPRS Support Node, a Packet Data Network Gateway or a combination of a Serving Gateway and a PDN Gateway.

14. The method according to any of claim 9, wherein said caching entity is comprised in a radio access network node.

15. The method according to any of claim 9, wherein said caching entity is comprised in said gateway.

16. The method according to claim 9, further comprising:

intercepting a second request for content on an uplink from a second wireless user equipment; and responding to the content requested by the second request not being presently cached in said cache memory by waiting to complete the second request until the content is cached in said cache memory and then delivering the content from the cache memory to the second wireless user equipment.

* * * * *